June 5, 1923.

W. E. PIPER 1,457,794

SETTLING APPARATUS

Filed Feb. 15, 1923

W. E. PIPER 1,457,794

SETTLING APPARATUS

Filed Feb. 15, 1923

INVENTOR
William Eugene Piper
BY
Pennie Davis Marvin & Edmonds
his ATTORNEYS

Patented June 5, 1923.

1,457,794

UNITED STATES PATENT OFFICE.

WILLIAM EUGENE PIPER, OF NEW CANAAN, CONNECTICUT, ASSIGNOR TO THE DORR COMPANY, OF NEW YORK, N. Y., A CORPORATION OF DELAWARE.

SETTLING APPARATUS.

Application filed February 15, 1923. Serial No. 619,148.

*To all whom it may concern:*

Be it known that I, WILLIAM EUGENE PIPER, a citizen of the United States, residing at New Canaan, in the county of Fairfield, State of Connecticut, have invented certain new and useful Improvements in Settling Apparatus; and I do hereby declare the following to be a full, clear, and exact description of the invention, such as will enable others skilled in the art to which it appertains to make and use the same.

This invention relates to apparatus primarily intended to remove solid material from settling tanks, but it may be utilized in analogous operations, and consequently while it is described herein by reference to a particular application this description is not intended as a limitation of the invention.

It has been customary heretofore to employ circular tanks for settling and like operations involving the handling of liquids in which solids are present in suspension. The primary reason for the selection of such tanks is the possibility of using conveyers consisting of arms carrying suitable plows and supported on a vertical rotating shaft whereby the settled solids may be removed from the tank. Such conveyers constitute the simplest means for the accomplishment of their purpose, being inexpensive and easily maintained in operative condition. Where a number of tanks are grouped together, a square tank is much more economical of space, and economy in this respect is sometimes of great importance in the installation of plants.

Square or rectangular tanks have been employed for settling, but the means available for discharging the solids has not been satisfactory. Such means consists of a transverse scraper and connections for dragging the scraper over the bottom of the tank to discharge the solids into a sump at one end thereof. Aside from the necessity of providing pulleys, joints, bearings, etc. below the liquid level where they are subject to rapid deterioration by erosion and corrosion, an additional difficulty is presented in keeping the discharge clear of solids. Unless auxiliary scraping mechanism is provided in the sump, the latter is rapidly clogged with solids and the mechanism required to keep it clear is complicated and expensive.

It is the object of the present invention to provide a rotating scraper which is applicable to and capable of functioning in a substantially square tank to move solids therein substantially as similar scrapers are employed in circular tanks.

Other objects and advantages of the invention will be apparent as it is better understood by reference to the following specification and accompanying drawings in which the preferred embodiments of the invention are illustrated. It should be understood that the illustrations are suggestive and that the invention may be embodied in various forms other than those shown in the drawings, in which—

The invention depends upon the use of auxiliary arms which rotate with the scraper arms, moving over the spaces which are outside the circle inscribed by the ends of the scraper arms and automatically swinging to inoperative position where that circle is tangent with the sides of the tank. The auxiliary arms may be pivoted upon the scraper arms and preferably cooperate with a guide rail at the sides of the tank to ensure smooth operation.

Figure 1:
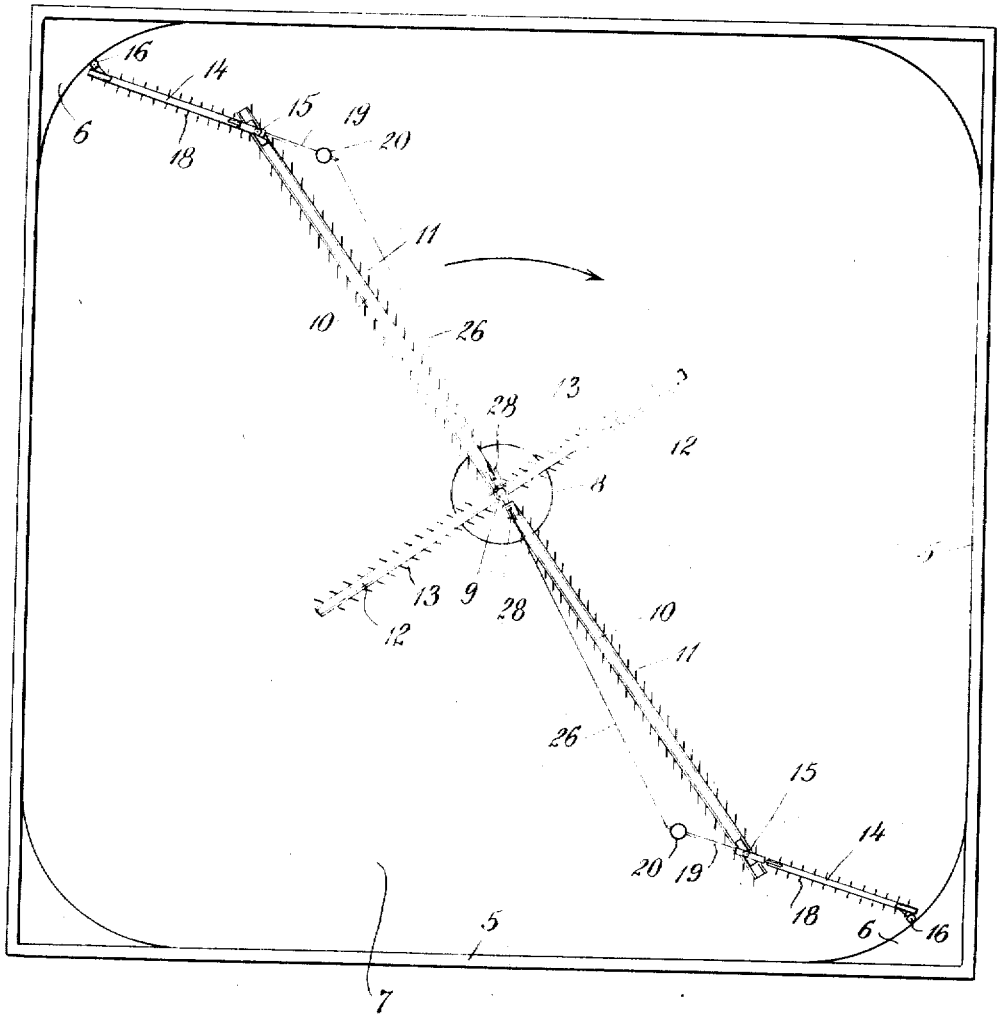
Fig. 1 is a plan view of a settling tank embodying the invention.
Figure 2:
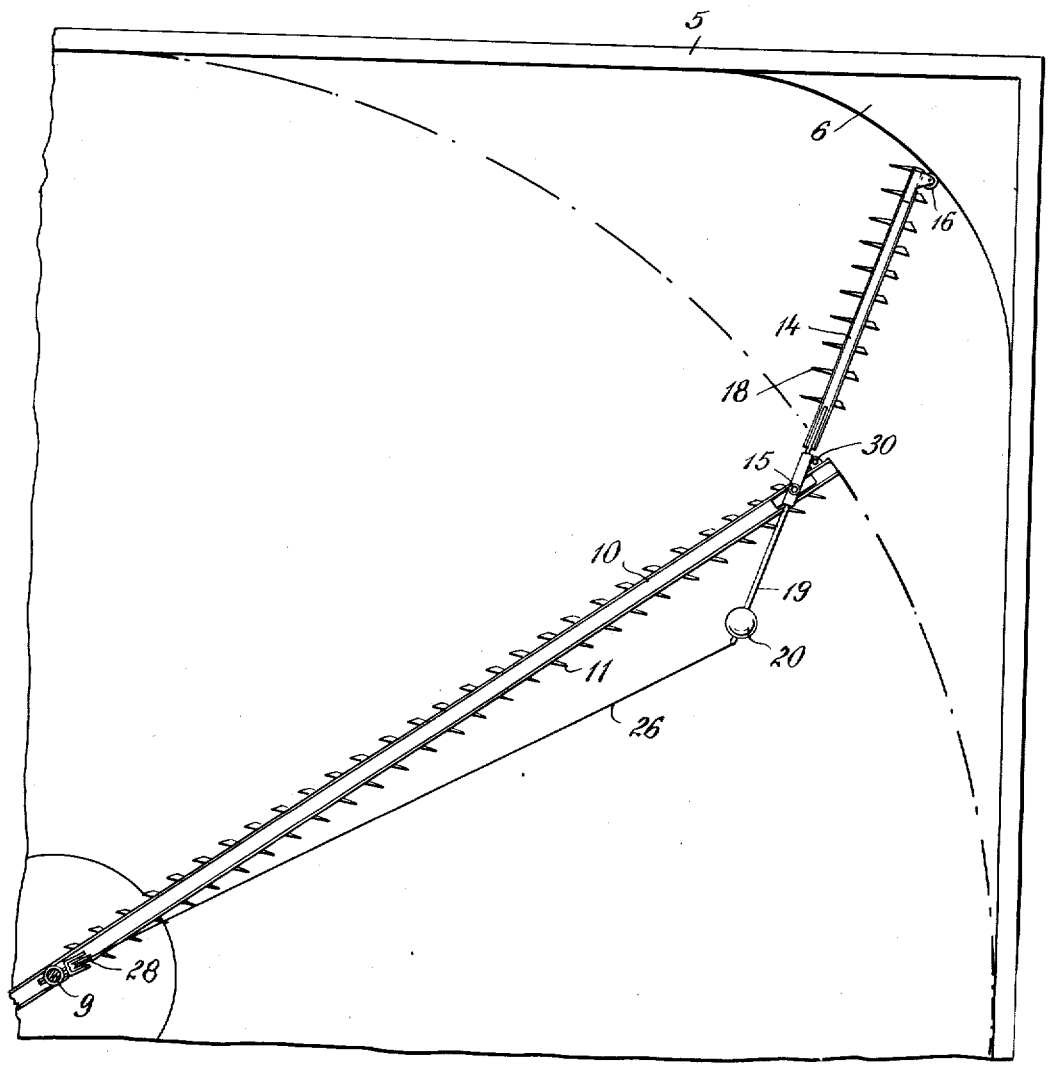
Fig. 2 is an enlarged plan view of one of the scraper arms.
Figure 3:
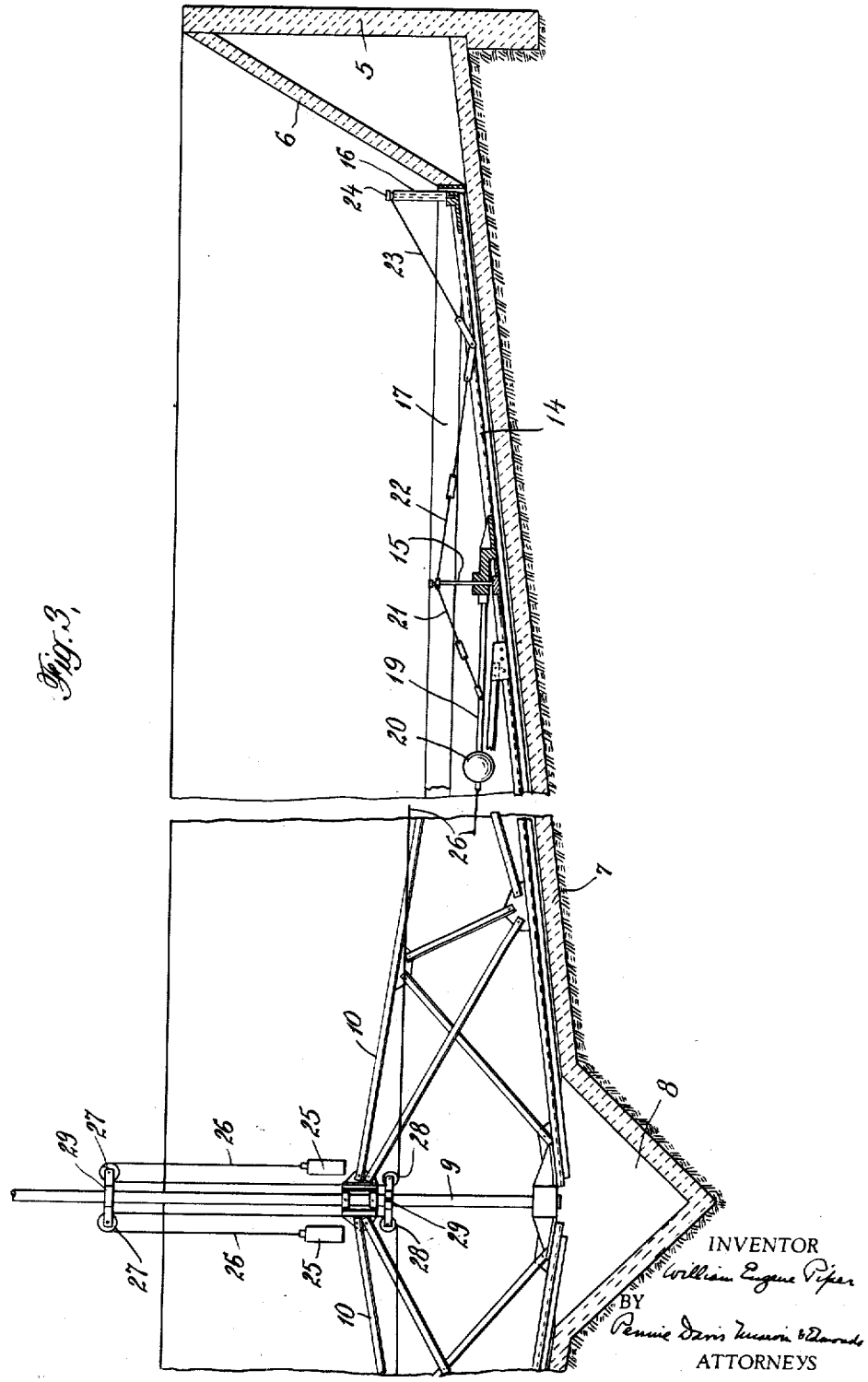
Fig. 3 is a sectional view of a tank showing the scraper arm in elevation.

Referring to Figs. 1 to 3 of the drawing, 5 indicates the side walls of a square tank which may be constructed of concrete or other suitable material. Fillers 6 are disposed in the corners to avoid the angle which might otherwise interfere with the operation. In the present embodiment the tank is provided with a floor 7 sloping toward a sump 8 at the center of the tank. A suitable outlet from the sump is provided so that solids may be discharged therefrom. The form of the tank may vary, depending upon the particular purpose for which it is used.

A vertical shaft 9 is suspended in a suitable bearing above the center of the tank and is adapted to be rotated from a source of power (not shown). Arms 10 are secured to the shaft and extend on opposite sides thereof over the bottom of the tank. These arms may be fabricated as shown in Fig. 2 to reduce their weight. A series of plows 11 is secured to the lower side of each arm, the plows being fixed at the proper angle to move solid material on the bottom of the tank in the desired direction when the shaft 9 is rotated. Shorter arms 12 carrying plows 13 may be secured to the shaft 9 between the arms 10 to assist in moving the solid material in the zone where it is accumulated by the action of the longer arms. The structure so far described is one which has been successfully used heretofore in handling solids in settling tanks.

For the purpose of reaching the material in the corners of the square tank, auxiliary arms 14 are articulated with the arms 10 by pivots 15 and are preferably provided with rollers 16 which cooperate with a guide rail 17 secured to the walls of the tank. The arms 14 are provided with angularly disposed plows 18 adapted to move over the bottom of the tank and extensions 19 which preferably carry counterweights 20 adapted to balance the weight of the arms 14 and thus relieve the strain on the pivots 15. The arms 14 may be stiffened by guys 21 and 22 connecting the pivot 15 to the extensions 19 and arms 14 respectively and guys 23 connected to the arms 14 and posts 24 at the extremities thereof.

The auxiliary arms 14 are caused to move outwardly into the corners of the tank by suitable means such as springs or preferably by weights 25 connected to cables 26 which run through pulleys 27 and 28 to the ends of the extensions 19. The pulleys 27 and 28 are mounted on collars 29 on the shaft 9. As the arms 10 swing about the tank the auxiliary arms follow the contour of the sides, the weights 25 holding the rollers 16 in contact with the rail 17. Stops 30 are provided, preferably at the ends of the arms 10, to limit outward movement of the auxiliary arms 14. This is particularly desirable when two or more sets of arms are mounted in a rectangular tank in which they are operated in synchronism.

Figure 4:
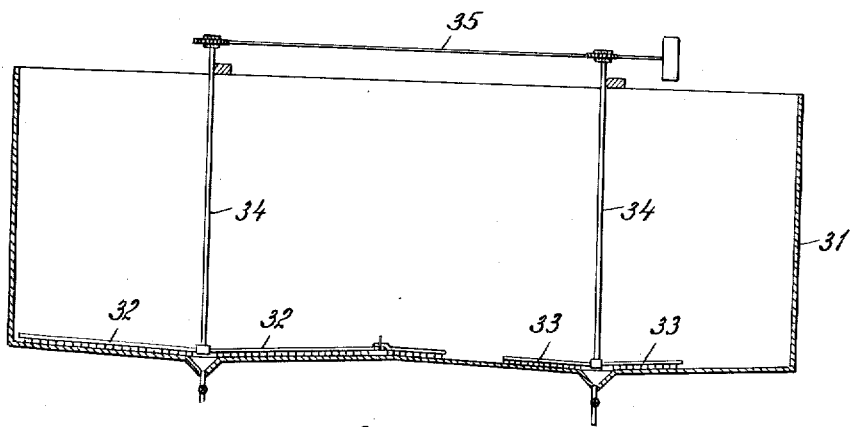
Figs. 4 and 5 are a vertical section and plan view respectively, illustrating the application of the invention to a rectangular tank.
Figure 5:
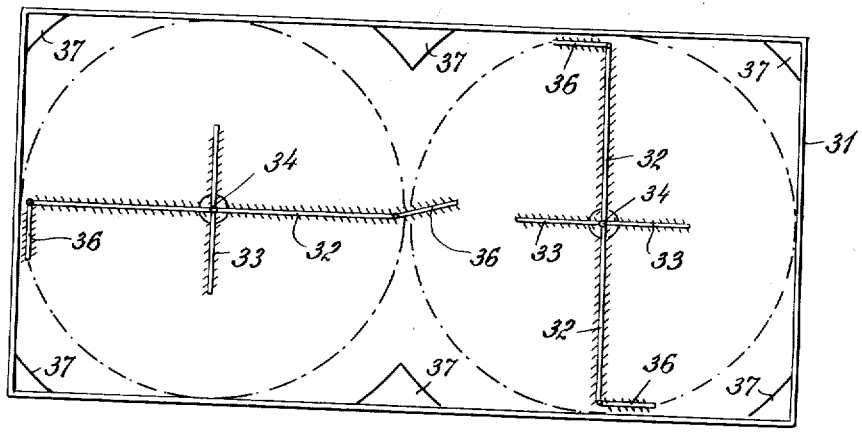

In Figs. 4 and 5 of the drawing such a rectangular tank 31 is illustrated. Arms 32 and 33 are supported on shafts 34 which are driven in synchronism through a shaft 35 from a suitable source of power. The arms 32 are provided with auxiliary arms 36 which sweep the corners of the tank. The arms 32 are set so that arms 36 do not interfere as their respective shafts are rotated, and the stops 30 as previously described prevent the auxiliary arms 36 from striking the fillers 37 disposed midway of the longer walls of the tank. Of course the tank could be divided into two square tanks by a light partition wall without affecting the operation of the scraper arms.

The present invention permits maximum utilization of available space in operations requiring the movement of material as herein described. The structural arrangement is simple, and the apparatus may be operated at a relatively slight power cost. The facility and economy with which material may be treated in tanks embodying the invention assure its application for a variety of purposes to which it is adapted.

Various changes may be made in the details of construction as shown and described herein without departing from the invention or sacrificing any of the advantages thereof.

I claim:—

1. In an apparatus of the character described, rotating means for moving solid material over a non-circular surface, said means being pivotally articulated and capable of expanding and contracting to accommodate itself to the area of the surface.

2. In an apparatus of the character described, a rotatable shaft, arms thereon carrying plows for moving solid material over a surface, and means associated with the arms and movable relatively thereto, said means carrying plows which sweep the area of the surface outside the area inscribed by the ends of the arms.

3. In an apparatus of the character described, a rotatable shaft, arms thereon carrying plows for moving solid material over a surface and auxiliary arms pivotally supported and carrying plows which sweep the area of the surface outside the area inscribed by the ends of the first mentioned arms.

4. In an apparatus of the character described, a rotatable shaft and articulated means thereon carrying plows adapted to sweep a surface, the effective length of the articulated means being automatically changed as the shaft rotates.

5. In an apparatus of the character described, a rotatable shaft and articulated means thereon carrying plows adapted to sweep a surface, and means for varying the effective length of the articulated means as the shaft rotates.

6. In an apparatus of the character described, pivotally articulated sweeping means, means for moving the sweeping means over a non-circular surface and means for causing relative movement of the articulated means.

7. In an apparatus of the character described, the combination of a tank having rectilinear walls and a bottom, and rotating means in the tank capable of expanding and contracting to accommodate itself to the area of the bottom, said rotating means carrying plows to move solid material.

8. In an apparatus of the character described, the combination of a tank having rectilinear walls and a bottom, rotating means in the tank capable of expanding and contracting to accommodate itself to the area of the bottom, said rotating means carrying plows to move solid material, and means for guiding the rotating means at the walls of the tank.

9. In a rectangular settling tank, a centrally rotating operated mechanism and means for causing said mechanism to expand and contract in a predetermined manner to sweep the entire bottom of the settling tank.

10. In a rectangular settling tank, a centrally operated rotating mechanism for conveying solids settling on the bottom of said tank to a point of discharge, and means for causing said mechanism to expand and contract in a predetermined manner to sweep the entire bottom of the settling tank.

11. In an apparatus of the character described, a rotatable shaft, arms thereon having means for moving solid material over a surface and auxiliary arms pivotally supported thereon and having means to sweep the area of the surface outside the area inscribed by the ends of the first-mentioned arms.

In testimony whereof I affix my signature.
WILLIAM EUGENE PIPER.

Certificate of Correction.

It is hereby certified that in Letters Patent No. 1,457,794, granted June 5, 1923, upon the application of William Eugene Piper, of New Canaan, Connecticut, for an improvement in "Settling Apparatus," an error appears in the printed specification requiring correction as follows: Page 3, line 13, claim 9, for the words "rotating operated" read *operated rotating;* and that the said Letters Patent should be read with this correction therein that the same may conform to the record of the case in the Patent Office.

Signed and sealed this 17th day of July, A. D., 1923.

[SEAL.]

WM. A. KINNAN,
*Acting Commissioner of Patents.*